United States Patent [19]

Tsukamoto et al.

[11] Patent Number: 4,693,348

[45] Date of Patent: Sep. 15, 1987

[54] DIRECT COUPLING CLUTCH WITH AN INTEGRAL DAMPER DEVICE FOR A FLUID COUPLING

[75] Inventors: Kazumasa Tsukamoto, Toyota; Masahiro Hayabuchi; Koji Maeda, both of Anjo; Kazuaki Watanabe, Toyota; Yutaka Taga, Aichi, all of Japan

[73] Assignees: Aisin Warner Kabushiki Kaisha; Toyota Jidosha Kabushiki Kaisha, both of Aichi, Japan

[21] Appl. No.: 856,765

[22] Filed: Apr. 28, 1986

[30] Foreign Application Priority Data

Apr. 30, 1985 [JP] Japan .................................. 60-93453
Apr. 30, 1985 [JP] Japan .................................. 60-93455

[51] Int. Cl.$^4$ ............................................. F16D 3/66
[52] U.S. Cl. .................................. 192/3.29; 192/106.2
[58] Field of Search ............... 192/106.1, 106.2, 3.28, 192/3.29, 3.3, 3.31

[56] References Cited

U.S. PATENT DOCUMENTS

| | | | |
|---|---|---|---|
| 4,399,895 | 8/1983 | Kubo et al. | 192/3.29 |
| 4,422,535 | 12/1983 | Ling | 192/3.28 |
| 4,512,449 | 4/1985 | Motomura et al. | 192/3.28 |
| 4,559,024 | 12/1985 | Tamura et al. | 192/106.2 X |

Primary Examiner—George H. Krizmanich
Attorney, Agent, or Firm—Koda and Androlia

[57] ABSTRACT

A direct coupling clutch being assembled within a casing of a fluid coupling having an impeller mounted on the casing and a turbine rotatably supported within the casing. The direct coupling clutch includes a piston slidably mounted on a turbine hub in axial direction for engaging with and disengaging from a front cover of the casing and a unitary assembled damper device provided between the hub and piston. The damper device includes a driven plate consisting of two annular guide plates positioned concentrically with each other, an annular drive plate interposed between the guide plates and being slidable with respect to the guide plates in circumferential direction and two sets of coil springs arranged in double rows along two concentric circles between the guide plates and being compressed by relative rotation of the drive and driven plates. The damper device is unitary assembled by securing the guide plates with each other and is capable to fixedly connect to one member of either turbine hub or piston by one plate of either drive plate or driven plate and to axially slidably connect to another member by another plate.

2 Claims, 15 Drawing Figures

DIRECT COUPLING CLUTCH WITH AN INTEGRAL DAMPER DEVICE FOR A FLUID COUPLING

BACKGROUND OF THE INVENTION

1. Field of the Invention

The present invention relates in general to a direct coupling clutch for a fluid coupling and especially to a diect coupling clutch for automotive transmission hydraulic torque converters operative to transmit torque in a fluid drive relationship from the output shaft of a vehicle engine to the input shaft of a transmission mechanism through a contained fluid interposed between an input element drivingly engaged to the engine output shaft and an output element operatively connected to the transmission input shaft. This invention is more particularly directed to such a clutch which comprises apiston member adapted to frictionally engage with the input element and a damper device consisting of a drive plate to drivingly integrate with the piston member and a driven plate to drivingly connect with the drive plate through resilient torsional force absorbing means such as coil springs arranged in the driven plate.

2. Description of the Prior Art

In the prior art, there have been proposed various dampers for hydraulic torque converter clutches for damping the torsional vibrations delivered from vehicle engines to transmission mechanisms at the lockup of the torque converter. In a most typical example, the damper consists in the main of a driven plate designed to drivingly engage with the transmission mechanism input shaft and carrying thereon a row of coil springs, normally in groups differing in spring characteristic from each other, located adjacent to its external periphery, arranged in circumferentially spaced apart relationship, and a drive plate disposed opposite to the driven plate and designed to drivingly engage with the engine output shaft through a piston member. The drive plate has a row of circumferentially spaced windows cut adjacent to its external periphery, so located and dimensioned that the springs installed in the driven plate are individually fitted into the windows. With this arrangement, when the torque converter is locked up, the torsional forces developed in the drive plate through the engine crankshaft are absorbed by the springs being compressed against the proper edge of their respective window.

With the development of high output engines in these recent years, dampers are more and more required to cope with the greater range of torsional vibratory changes in the hydraulic torque converters. However, those prior art dampers have been found disadvantageous in that the absorption of torsional vibrations at the lockup of the converter is limited by rather narrowly bounded capacity of the drive and driven plates to angularly displace to each other. To solve this problem, a damper employing tvo circumferential rows of resilient members has been proposed. U.S. Pat. Nos. 4,138,003, 4,347,717 and Japanese Laid-open Official Gazette No. 59-195957).

One such example is disclosed in U.S. Pat. No. 4,347,717, in which the damper consists of a drive plate, a driven plate disposed opposite the drive plate, and an intermediate plate interposed between the drive and driven plates. In operation, the drive plate drives through a circumferential row of springs located adjacent to its external periphary the intermediate plate carrying thereon outer and inner concentric circles of springs, the springs in the outer row differing in spring characteristic from the ones in the inner row, such that the torsional vibrations are absorbed by the inner row springs when they are engaged with the driven plate.

Another similar development has been proposed in U.S. Pat. No. 4,138,003, in which the output shaft of the fluid torque converter includes two driven plates carrying thereon two circumferential rows of springs. Two separate direct coupling clutch means are employed to transmit the torque delivered to the piston through the springs in the two rows respectively. Also, separate drive plates are installed for the two driven plates.

Thus, those conventional dampers exemplified by the above two teachings have not been widely acceptable because of the increased nember of components and, particularly in the latter case, the complexity of construction.

SUMMARY OF THE INVENTION

The present invention relates to a direct coupling clutch for fluid couplings and especially to a direct coupling clutch for vehicle automatic transmission hydraulic torque converters which can damp the torsional vibrations at all torque changes delivered from the engine output shaft to the transmission mechanism at the lockup of the converter.

It is an object of the present invention to provide direct coupling clutch having an unitary assembled damper device in which the range of angular rotation of the drive and driven plates relative to each other can be increased so that torsional vibrations over a wide range of torque changes can be damped at the lockup of the converter.

Another object of the present invention is to provide such a direct coupling clutch of simple construction which can be built in a compact design.

According to the main aspect of the invention, a direct coupling clutch for fluid couplings comprises a piston operative to engage the fluid coupling input shaft and a dampe consisting of a drive plate, two groups of resilient members, such as coil springs (hereinafter referred to coil springs) disposed opposite the drive plate and arranged in outer and inner concentric circles,and a driven plate drivingly engage with the drive plate through the coil springs, wherein the drive plate includes engaging projections adapted to absorb the toraional vibrations in conjunction with the coil springs, the projections being designed to come into engagement with at least one group of coil springs arranged in one of the inner and outer circles.

Because of this design, the clutch has a damper of very simple construction. Futhermore, the operating characteristic of the damper can readily be adjusted by changing the location of the engaging projections in the drive plate, which permits the invention to find application in a very wide field.

In addition, the absorption of torsional vibrations is effected by a single unit of drive plate in conjunction with two circumferential rows of coil springs with which engaging projections mounted in the drive plate are engaged in resilient relationship. Since these projections are bent properly out of contact with the driven plate to prevent friction betwaen the drive and driven plates while the fluid coupling is not in a lockup mode.

In a preferred embodiment of the present invention, the driven plate consists of first and second largely concentric guide plates fastened together with rivets along a diamater midway between the outer and inner circumferential rows of coil springs, the rivets located just below the middle of the respective springs in the outer row. The first guide plate is provided with apertures cut therein and arranged circumferentially in equally spaced apart layout. The drive plate has multiple engaging projections, bent at their forward end to fall out of contact with the driven plate, that are individually inserted through the apertures for engagement with the coil spring for purpose of damping operation. This design enables the range of compression of the coil springs increasing the capacity of the damper to absorb torsional vibrations.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts through the several views and wherein.

DETAILED DESCRIPTION OF THE PREFERRED EMBODIMENTS

Figure 1:
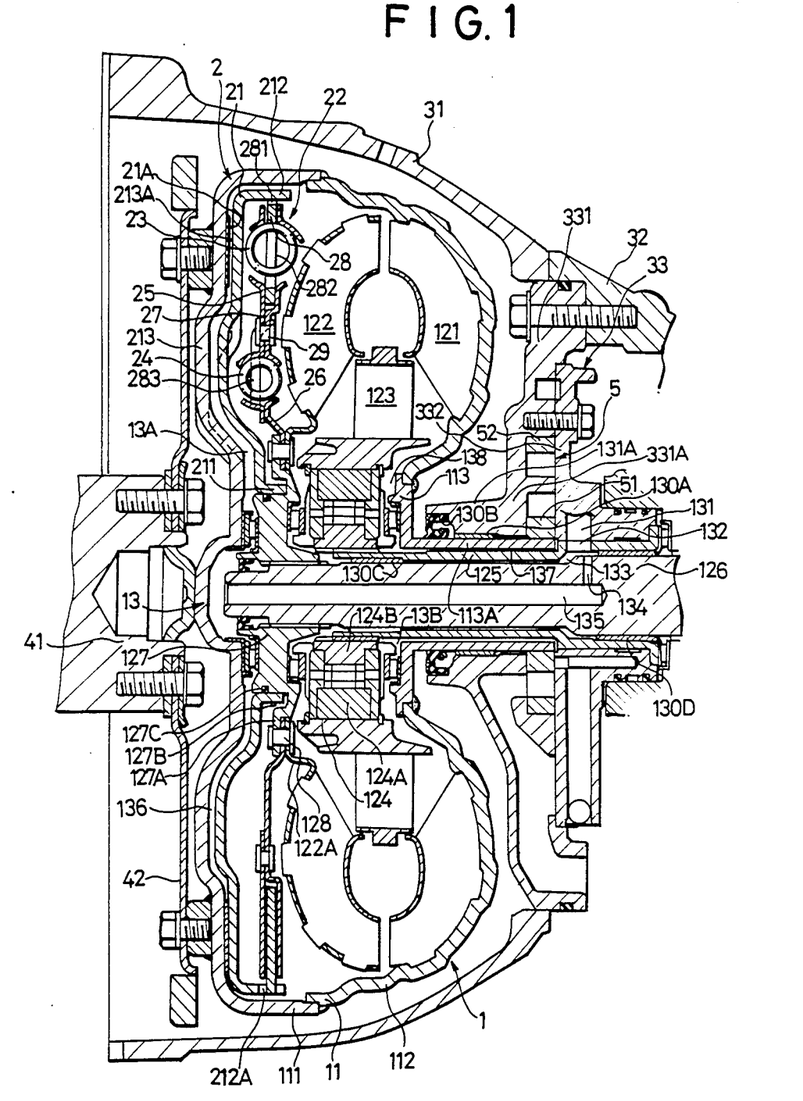
FIG. 1 a cross sectional view of a first embodimant of the direct coupling clutch for hydaulic torque converters according to the present invention as it is in assembly in such a converter.

Referring first to the drawings and in particular to FIG. 1, which illustrates a hydraulic torque converter incorporating a first preferred embodiment of the direct coupling clutch constructed in accordance with the present invention.

The fluid troque converter shown is of a type for vehicle automatic transmissions, which comprises a rotating fluid case 11 rotativaly disposed about the converter shaft 126 consisting of a front cover 111 and a rear cover 112, a pump impeller 121, a turbine runner 122, a fluid filling the case 11, and a direct coupling clutch, designated largely at 2. In function, the front cover 111 forms part of the clutch, which is hydraulically connected to a hydraulic line 13.

The torque converter 1 is enclosed in a converter housing 31 that is mounted between an engine (not shown) and a tranamission housing 32. The converter housing 31 is conjoined at its rear aide (in the right as viewed in FIG.1) to the front end wall of the transmission housing 32 encasing transmission mechanism, with the interposition of an oil pump housing 33 installed therebetween.

The fluid case 11 of the converter 1 has its front cover 111 of largely flat saucer shape connected through a starter wheel 42 to the crankshaft 41 to receive torque from the engine. The rear cover 112 is shaped like a dome inwardly dented in the center and welded at its periphery to the inside edge of the front cover 111. Also, the case 11 includes a driving sleeve 113 secured at its outer periphery to the inner periphery of the rear cover 112. The sleeve 113 is rotatively disposed about the converter shaft 126 and includes a sleeve portion 113A formed at a rear portion thereof. The oil pump housing 33 is comprised of a front cover 331, a rear cover 332 and a sleeve portion 331A made integral with the surface of the front cover 331 and formed to extend about the converter shaft. The sleeve portion 113A of the driving sleeve 113 has a rear part thereof to lie internally of the sleeve protion 331A, with the interposition of a metal bush 130A and an oil seal 130B. Mounted between the front and rear covers 331 and 332 of the oil pump housing 33 is an internal gear pump 5, which consists of an internal gear 52 and an external gear 51. The driving sleeve 113 has its sleeve portion 113A splined axially to the external gear 51 to drive the pump 5.

In the converter 1, the impeller 121 is made integral with the rear cover 112 for rotation therewith. Opposite the impeller 121 is rotatively disposed a turbine 122. With the converter 1 filled fully with the fluid, rotation of the rear cover 112 puts the fluid into motion and centrifugal force pushes the fluid from the center to the outer periphery of the impeller so that it discharged into the outer priphery of the turbine causing the latter to rotate. Between the impeller 121 and turbine 122 is mounted a stator 123, which is provided to reverse the fluid again and transfers it from the turbine to the impeller so that the fluid is further pushed by the impeller to increase the rotation of the turbine for torque multiplication.

A one-way clutch 124 is provided mounted in the converter 1 to prevent the force of the fluid from turning the stator 123 in the opposite direction from the impeller 121 and turbine 122. The one-way clutch 124 is comprised of an outer race 124A and an inner race 124B. The outer race 124A is connected through its outside circumference to the inside surface of the stator 123. The inner race 124B, on the other hand, is splihed to an axial fixed sleeve 125 through an enternal front portion thereof. The fixed sleeve 125 is formed to extend about the output shaft 126 and made integral with the rear cover 332 of the oil pump housing 33. It is so designed that the one-way clutch 124 rotates in a predetermined direction alone by the force of the fluid flowing through the stator 123.

The vanes of the turbine 122 are carried about a turbine flange 122A that is fixedly secured with rivets 128 to a hub flange 127A made integral in the circumference of a hub 127 splined to the output shaft 126 of the converter 1 so that the torque of the turbine 122 in rotation is delivered to the transmission mechanism. The output shaft 126 is rotatably dispoaed for free rotation in bearings 130C and 130D interposed between the outside circumference of the shaft 126 and the inside surface of the fixed sleeve 125, mounted at front and rear portions of the latter.

Figure 2:
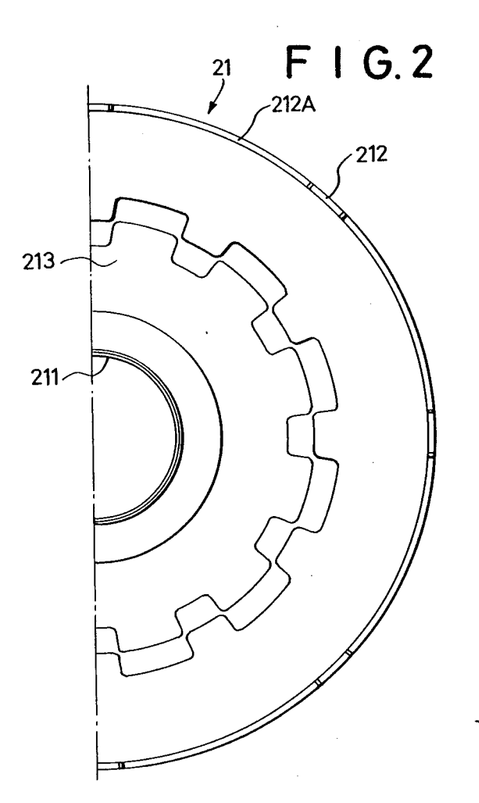
FIG. 2 is a front view of the piston member employed in the clutch depicted in FIG. 1.
Figure 3:
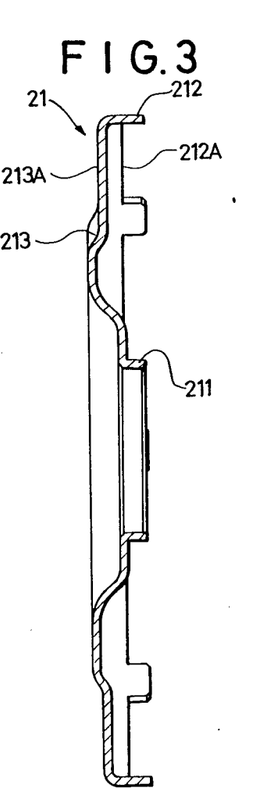
FIG. 3. is cross sectional view of the piston member of FIG. 3.

Referring to FIGS. 2 and 3, the direct coupling clutch 2, which is mounted between the front cover of the converter fluid case 11 and the turbine 122, comprises in combination of a damper 22 and a piston of annular shape, largely designated at 21, composed of a central annular plate portion 213 and a pair of an inner sleeve portion 211 and an outer sleeve portion 212 formed along the inner and outer edges of the plate protion 213, respectively. The damper 22 is designed to damp the impacts delivered from the engine to the transmission mechanism when the converter is locked up.

In more detail, the piston 21 is slidably disposed about the hub 127 for axially sliding movement with respect to the hub 127, with its inner sleeve portion 211 being located in an annular recess 127B formed in the periphery of the hub 127 with the interposition of a sealing ring 127C. The annular plate portion 213 has in its surface facing the front cover 111 an annular engaging surface 217 formed substantially normal to the axis of the output shaft 126. Opposite the engaging surface 217 is provided an annular friction lining 21A mounted in the flat portion of the inside surface of the front cover 111, also formed substantially normal to the axis of the output shaft 126, such that sliding movement of the piston 21 axially with respect to the shaft 216 brings the engaging surface 127 into frictional contact with the lining 21A of the front cover 111. The outer sleeve 212 is provided in its surface facing the damper 22 with a circumferential splined or castellated surface 212A, as may best shown in FIGS. 3 and 4, for a purpose as will latar be described.

With this arrangement, when the fluid present between the piston member 21 and the front cover 111 becomes less in pressure than the fluid exiting on the opposite side of the piston member in the fluid case 11 of the converter, the piston member 21 is caused to axially slide into contact with the inside surface of the front cover 111 bringing the output shaft 126 of the converter into connection with the input shaft of the converter 1, i.e. the crankshaft 41 of the engine.

Referring then to FIGS. 4 through 10, the damper 22 consists in the main of a largely annular disk shaped driven plate 27 mounted about the converter output shaft 126 and a largely annular disk shaped drive plate 28 disposed opposite the driven plate 27. The driven plate 27 is composed of a first circular guide plate 25 mounted to stand parallel with the front cover 111 and a second circular guide plate 26 disposed opposite the first guide plate 25.

Figures 6, 7:
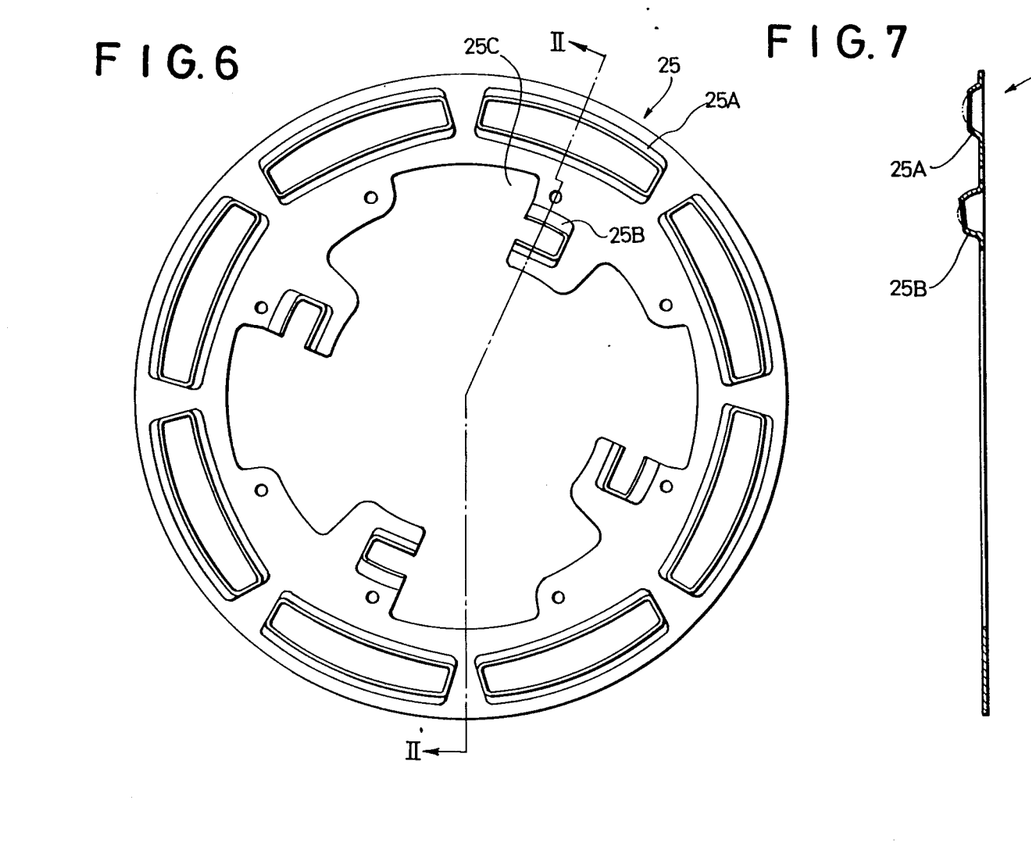
FIG. 6 is a front view of the first guide plate in the clutch.
FIG. 7 is a cross sectional view taken along the line II—II of FIG. 6.
Figures 8, 9:
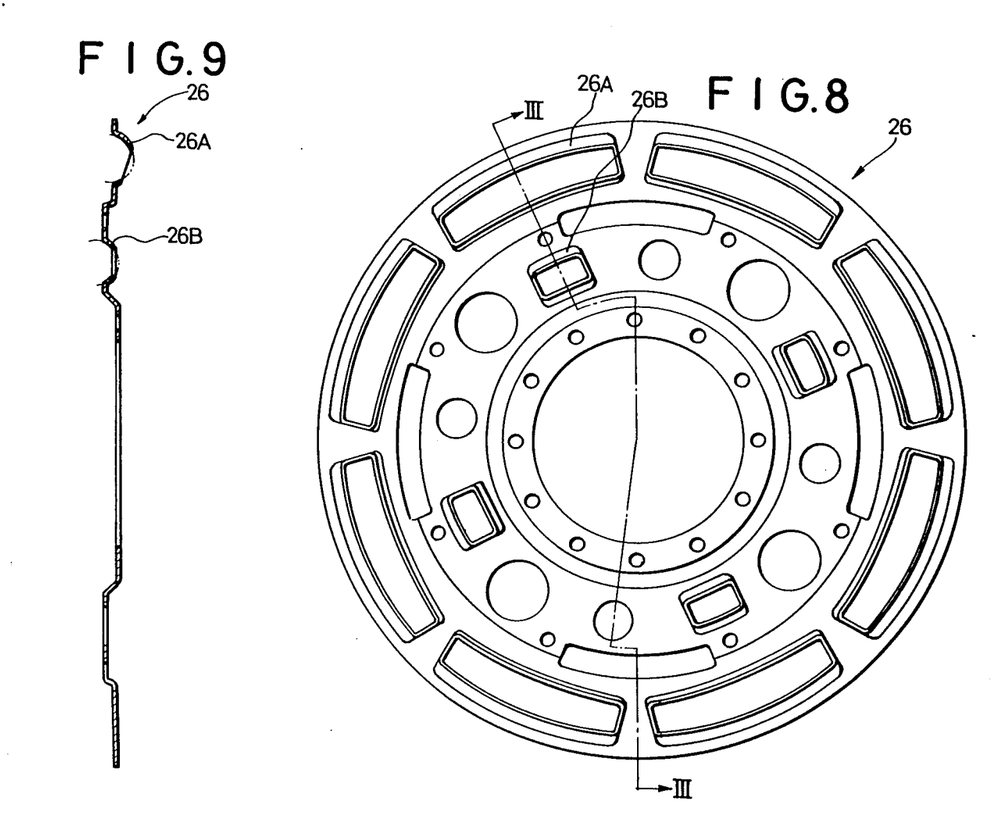
FIG. 8 is a front view of the second guide plate in the clutch.
FIG. 9 is a cross sectional view taken along the line III—III of FIG. 8.

In the first guide plate 25, as may best shown in FIGS. 6 and 7, are formed a pair of radially spaced, circumferentially extending raised lips 25A and 25B for supporting thereon resilient members. Also, in the second guide plate 26 are provided a pair of similar raised lips 26A and 26B, as may best shown in FIGS. 8 and 9, located just to stand opposite, but built in opposite way, the lips 25A and 25B of the first guide plate, respectively. Thus, with the first and second guide plates 25 and 26 aasembled into the unitary driven plate 27, there are defined a pair of outer toroidal space 23A between the lips 25A and 26A adjacent to the external periphery of the driven plate 27 and inner toroidal space 24A between the inner lips 25B and 26B, located radially internally of the outer space 23A, as may best shown in FIG. 4.

Figures 4, 5:
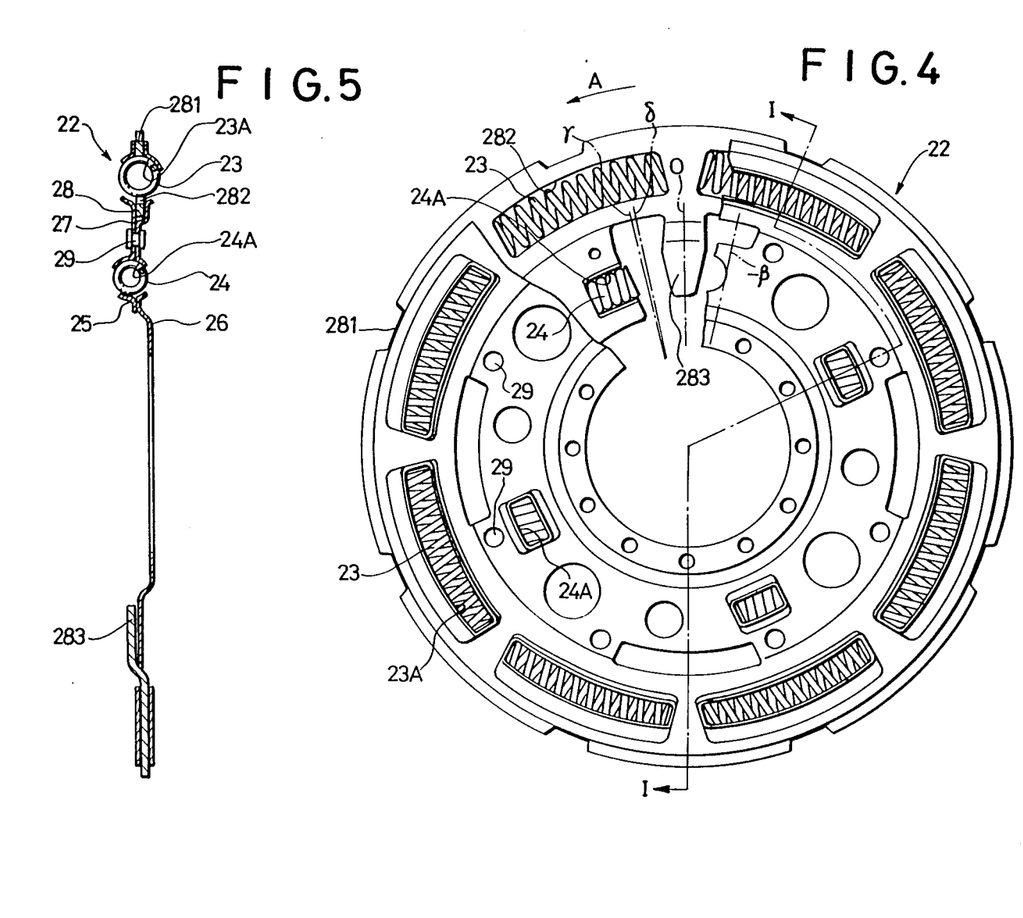
FIG. 4 is a front view of the damper in the clutch shown in FIG. 1.
FIG. 5 is a cross sectional view taken along the line I—I of FIG. 4.

In the outer toroidal space 23A are disposed a first group of similar coil springs 23 in fixed positions, as shown in FIG. 4. Likewise, a second group of similar coil springs 24 are provided placed in fixed positions in the inner toroidal space 24A. The coil springs 23 in the outer space 23A are individually smaller in spring constant and larger in compression stroke length in compared with those of the coil springs 24, hence more resilient than the springs 24 in the inner space 24A for a purpose as will later be explained.

In addition, the first guide plate 25 is formed with a number of circumferential arcuate cutouts 25C, preferably located along a diameter substantially midpoint between the outer and inner spaces 23A and 24A, as shown in FIG. 6. The arcuate length of the cutouts 25C are selected to determine the range of sliding movement of engaging projections that are individually inserted into the cutouts 25C for engagement with the coil springs 24 in the inner space 24A, as will later be described in detail.

Figure 10:
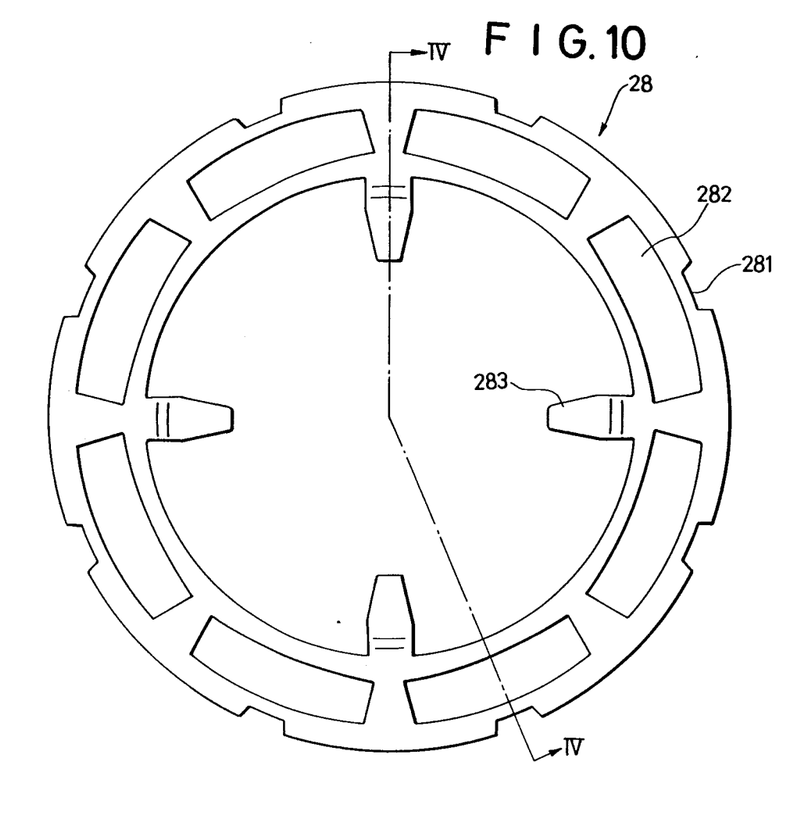
FIG. 10 is a front view of the drive plate in the clutch.
Figure 11:
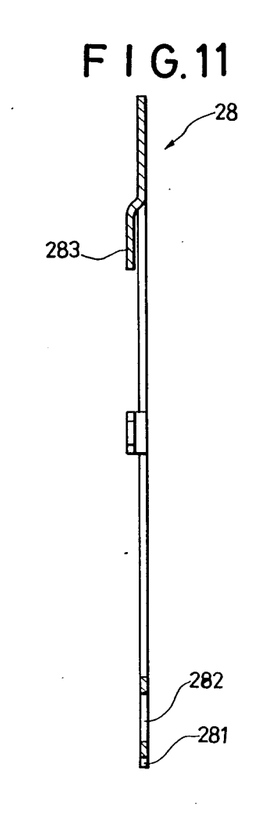
FIG. 11 is a cross sectional view taken along the line IV—IV of FIG. 10.

Referring then to FIGS. 10 and 11, the drive plate 28 is provided with a circumferential surface 281 splined or castellated at intervals along the diameter, adjacent to its external periphery, located to just come opposite the cooperatively castellated surface 212A formed in the outer sleeve 212 of the piston member 21. The castellated surface 281 is provided to drivingly engage the drive plate 28 with the piston member 21 through the castellated surface 212A for integral rotation with each other.

Also, in the drive plate 28 are formed a number of preferably equally spaced, circumferencial windows 282, located to just come opposite the outer toroidal space 23A in the driven plate 27, the number being related with the coil springs 23 in the outer space 23A, sized to just fittingly receive therein the springs 23 individually, as may best shown in FIG. 4. With this arrangement, when the drive plate 28 is rotated relative to the driven plate 27 as a result of torque difference between the plates 27 and 26 as at the lockup of the converter 1, the torsional vibrations developed in the drive plate 28 are damped or absorbed by the springs 23 as they are compressed by the proper edge of the windows 282.

In addition, the drive plate 28 is formed with radially inwardly extending engaging projections 283 in the relative number with the arcuate cutouts 25C formed in the first guide plate 25, properly arranged in spaced apart layout throughout the entire diameter, and bent appropriately on the side of the piston member 21, as may best shown in FIG. 11, such as to extend their lower ends through the cutouts 25C into a diameter adjacent to the inner toroidal space 24A, in front of the leading end of the coil springs 24, where the inner space 24A is opened to expose that end of each spring 24 for proper engagement with the lowee end of the respective projection 283.

Since the spacing between the engaging projections 283 and their corresponding coil springs 24 is determined such that, when the angle of relative rotation between the drive and driven plates 28 and 27 has caused the window 282 to compress the coil springs 23 beyond a predetermined extent, the springs 24 in the inner toroidal space 24A begin to be compressed by the projections 283.

In this way, imbalance in torque between the drive and driven plates up to a certain magnitude is damped by the springs 23 in conjunction with the windows 282. When the difference becomes greater than this limit, the springs 24 with the projections 283 help in effecting the damping.

Furthermore, as proviously touched upon in passing, the arcuate length of the cutouts determines, in conjunction with the engaging projections 283 inserted into the cutouts 25C formed in the first guide plate 25, the maximum angle of relative rotation between the drive and driven plates 28 and 27.

In more detail, referring to FIG. 4, if the torque difference between the drive and driven plates 28 and 27 at the lockup of the converter is great enough to cause the windows 282 to engage the springs 23 but not great enough to bring the projections 283 into engagement with the springs 24, $\delta$ and $-\beta$ are the largest angles but in opposite directions of the relative rotation of the drive plate 28 to the driven plate 27.

Further, if the difference in torque becomes greater such as to cause the engaging projections 283 to compress the springs 24, in addition to the urging engagement of the windows 282 with the springs 23, the angle of counterclockwise rotation of the drive plate 28 relative to the drive plate 28 might be somewhere above $\delta$ up to $\gamma$, the maximum angle limited by the range of sliding movement of the engaging projections 283 through the specific arcuate length of the cutouts 25C.

In the driven plate 27, the first guide plate 25 is secured onto the second guide plate 26 with rivets 29 at circumferential locations along a diameter equally radially spaced from the inner and outer spaces 24A and 23A, each positioned just below the center of the respective spring 23 in the outer apace 23A. The castellated surface 281 in the external periphery of the drive plate 28 is cut in castellation at circumferential points throughout the diameter just opposite the coil springs 23, respectively. To insure proper engagement, the castellated surface 212A, in the external sleeve 212 of the piston member 21 is cut in spline at diametrial locations opposite the castellated portion in the surface 281.

As shown in FIG. 1, the driven plate 27 has its second guide plate 26 secured along an innner periphery thereof, together with the turbine flange 122A, to the hub flange 127A of the turbine hub 127 with rivets 128.

The assembly of the damper 22 with the above construction may be achieved in the following manner. First, the first guide plate 25 is placed flat, with the open side of the outer and inner lips 25A and 25B faced up, then the drive plate 28 is mounted on top of the first guide plate 25 in such a way that the windows 282 is fitted on the spaces defined by the outer and inner lips 25A and 26A. The coil springs 23 and 24 are properly laid in the outer and inner lips 25A and 25B and within the windows 282, respectively. The assembly thus formed is set on a caulking machine. Then, the second guide plate 26 is put onto the assembly in such a manner that the outer and inner lips 26A and 26B come just on the outer and inner lips 25A and 258 of the first guide plate 25 to form the outer and inner circumferential spaces 23A and 24A, with the coil springs 23 and 24 being properly arranged therein. This assembly process may be started with the second guide plate 26, following the above described steps, except that the terms "first guide plate" and "second guide plate" are replaced by "second guide plate" and "first guide plate", respectively. Finally, the assembly set on the caulking machine is supplied with rivets 29 and the first and second guide plates 25 and 26 are fastened with each other by caulking the rivets 29, thereby the assemblihg of the unitary damper device is achieved.

The hydraulic line 13 is consisted of a first oil line 13A, a second oil line 13B and a hydraulic control system (not shown) of any conventional type which is capable of hydraulically controlling pressure prevailing in the hydraulic line 13 in such a manner that it pressurizes the first and second lines selectively, one at a time, leaving the other to become a return line to a drain port with a resultant pressure reduction in that line.

The first oil line 13A is composed of a radial passage 131 formed within the rear cover 332 of the oil pump housing 33, a second radial passage 132 formed in communication with the passage 131 in the fixed sleeve 125, an axial passage 133 defined in the axial hollow of the fixed sleeve 125 between the bearings 130A and 130D, a second axial passage 135 formed through the axis of the converter output shaft 126, a third passage 134 formed to interconnect the second radial passage 132 and the second axial passage 135 adjacent to the oil pump housing 33, and a radial oil chamber 136 defined between the inside surface of the front cover 111 and the opposed surface of the piston member 21, formed in communication with the second axial passage 135.

The second oil line 13B is composed of a passage (not shown) formed in the front cover 331 of the oil pump housing 33, an axial passage 137 defined between the inside surface of the sleeve portion 113A of the driving sleeve 113 and the outside circumference of the fixed sleeve 125 and a radial chamber 138 formed in communication with the axial passage 137 between the front surface of the driving sleeve 113 and the rear surface of the one-way clutch 124 to supply oil into the fluid case 11 through the space defined by the impeller 121 and stator 123.

The operation of the hydraulic torque converter having the above-mentioned arrangement will be described in great detail.

First, the operation when the converter is not in lockup phase is explained.

The hydraulic control system supplies pressurized oil to the hydraulic line 13 to fill the converter fluid case 11 with oil through the first oil line 13A, so that the oil is allowed to take its return path from the fluid caae 11 to a to a reservoir (not shown) through the second oil line 13B and drain port.

Thus, since the oil starts to fill the fluid case 11 from the oil line 13A, the front surface of the piston member 21 facing the front cover 111 of the case is more pressurized than its rear surface on the side of the damper 22, moving the piston member 21 axially to bring the engaging surface 213A out of engagement with the circumferential lining 21A secured in the rear surface of the front cover 111. The oil through the gap thus opened between the front cover 111 and piston member 21 flows into the fluid case 11 and returns through the second oil line 13B.

With the piston member 21 in this disengaged position, the engine output from the crankshaft 41 is delivered through the stater wheel 42 to the impeller 121 which, in turn, runs the turbine 122 in fluid drive relationship. In this way, the torque is transmitted from the turbine 122 to the converter output shaft 126, without the intervention of the direct coupling clutch 2.

The operation of the clutch 2 when the converter is locked up will be described.

The hydraulic control system supplies to the fluid case 11 the oil through the second oil line 138, so that the oil returns from the fluid case 11 through the first oil line 13A and the drain port to the reservoir.

In this direction of fluid circulation, in which the fluid in the case 11 if more pressurized in the impeller 121 than in the space defined by the front cover 11 and the piston member 21 now in direct fluid communication with the second oil line 13A, the piston member 21 is caused to move axially toward the front cover 111 bringing the engaging surface 213A into engagement with the front cover lining 21A. As a result, the engine output from the crankshaft 41 is now transmitted directly to the converter output shaft 126 through the piston member 21, the damper 22, and the hub 127.

Figure 12:
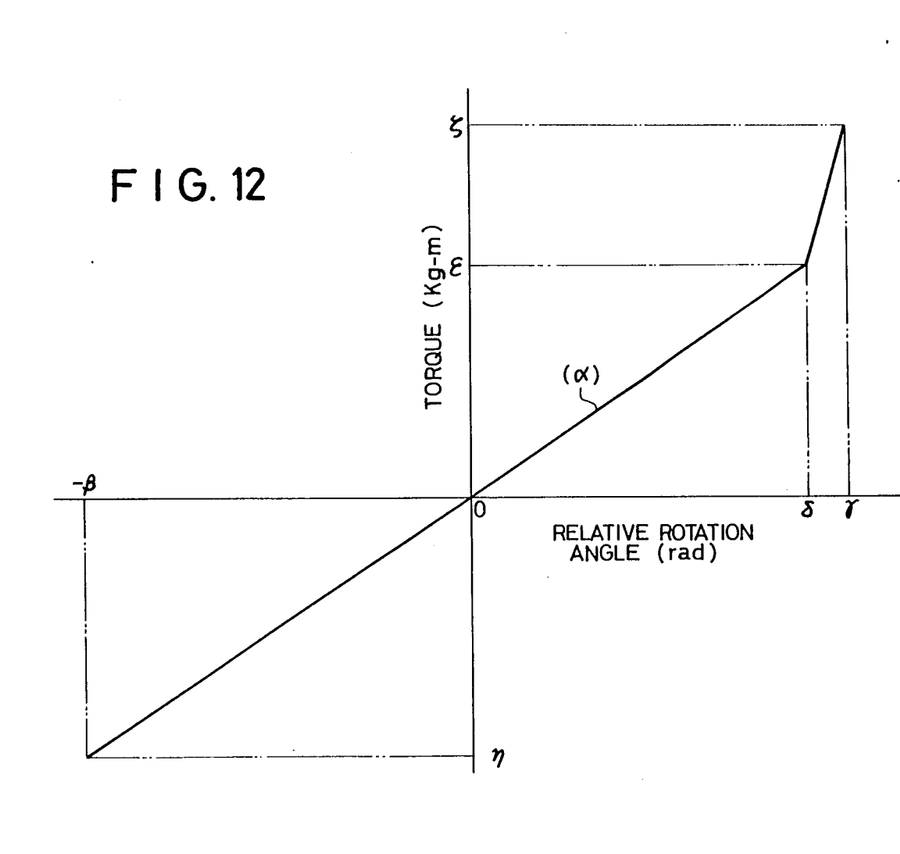
FIG. 12 shows in diagramatic the relationship between difference in torque being absorbed by the damper and relative rotation angle occured between the drive and driven plates according to the present invention.

The characteristic damping operation of the damer 22 in response to different torsional changes in motion delivered from the crankshaft 41 to the converter output shaft 126, will be described in reference to FIGS. 4 and 12.

Referring to FIG. 4, the arrow A indicates the direction of rotation of the engine crankshaft 41. When the converter 1 is not in a lockup mode, the damper 22 is rotated by the turbine 122 in mechanical drive relationship, the drive plate 28 turning in unison with the driven plate 27, with zero angle of rotational displacement between the plates, as represented by imaginary reference point 0. Now, when the converter is locked up, the drive plate 28 is shifted into engagement with the crankshaft 41 through the piston member 21, so that the drive plate 28 is subjected to the torque affected by the operating codition of the engine while the driven plate 27 is subjected to a different magnitude of torque than the drive plate 28 since the driven plate 27 is affected by the torque applied on the converter output shaft 126, depending on the driving condition of a vehicle.

First, the phases where the driven plate 28 has a graater torque than the driven plate 27 are considered. When the difference in torque is up to ϵ, according to the curve in FIG. 12, the range of angular rotation of the drive plate 28 relative to the driven plate 27, which is indicated to fall between 0 and δ in FIG. 4, is within the limit of compression of the coil springs 23 with a smaller spring constant achieved by the urging windows 282 of the drive plate 28. When the difference is at greater magnitude between ϵ and ζ (FIG. 12), the angle of relative rotation between the plates 27 and 28 increases until the coil springs 24 with a greater spring constant begins to be compressed by th engaging projections 283. The range of this angular displacement is indicated as between δ and γ in FIG. 4, where the both coil springs 23 and 24 are affected to absorb the torsional forces developed in the damper 22.

When the converter in locked up, the driven plate 27 may happen to have a greater torque than the drive Plate 28, as when the engine has just been running at a low revolving rate. Difference in torque in such a case is represented in negative magnitude in FIG. 12. Similarly in Principle to the opposite case as explained above, all differences in torque within the range between 0 and −η, i.e. within the range between 0 and −β in angular rotation of the drive plate 28 relative to the driven plate, is absorbed by the compression of the coil springs 23. Thus, the damper 22 can absorb the torsional vibrations between the engine and converter output shaft 126 when the driven plate 27 has greater torque.

Figure 14:
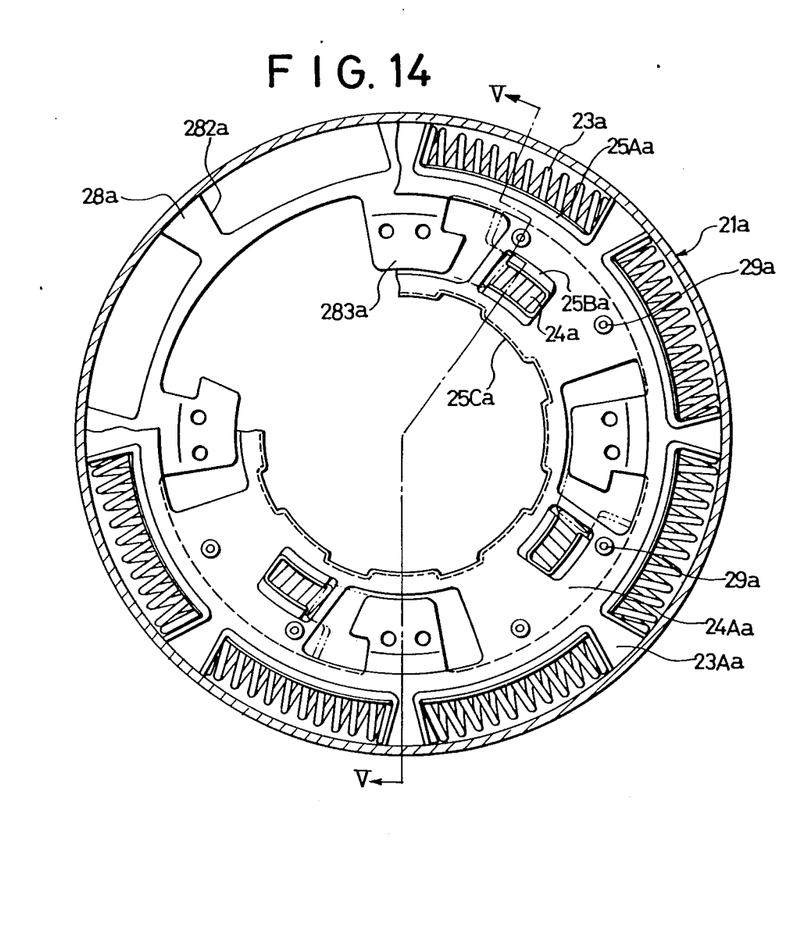
FIG. 14 is a front view of the damper in the clutch illustrated in FIG. 13.
Figure 15:
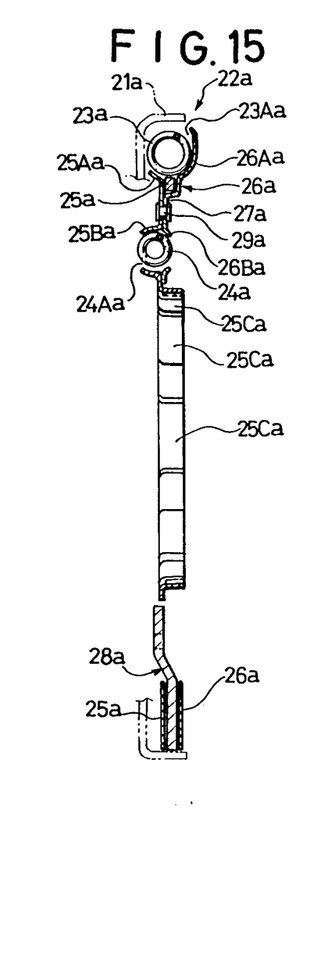
FIG. 15 is a cross sectional view taken along the line V—V of FIG. 14.

A second preferred embodiment of the present invention will be described with reference to FIGS. 13, 14 and 15.

A damper 22a for direct coupling clutches according to this invention comprises an annular disk shaped driven plate 27a composed of a concentric pair of first guide plates 25a and second guide plate 26a disposed opposite the first guide plate and an annular drive plate 28a carried by the driven plate 27a.

Substantially similar to the construction of the damper 22 in the previous embodiment, the first guide plate 25a is formed with a circumferential lip 25Aa adjacent to its external circumference and an inner circumferencial lip 25Ba located radially inwardly of the outer lip 25A. Also, the second guide plate 26a is formed with an outer circumferential lip 26Aa located opposite the outer lip 25Aa and an inner circumterential sil 26Ba running just opposite the inner lip 25Ba of the first guide plate 25a, defining an outer toroidal channel 23Aa between the Paired outer lips 25Aa and 26Aa and an inner toroidal channel 24Aa between the paired inner lips 25Ba and 26Ba.

In the outer channel 23Aa are provided a first group of similar coil springs 23a in fixed positions, preferably arranged in equally spaced apart layout throughout the diameter. Likewise, a second group of similar coil springs 24a are placed in fixed positions in the inner channel 24Aa, also preferably arranged in equally spaced apart layout through the circumference. The springs 23a in the outer channel 23Aa are individually smaller in spring constant and larger in compression stroke length in compared with those of the springs 24a hence more resilient than the springs 24a in the other channel.

Figure 13:
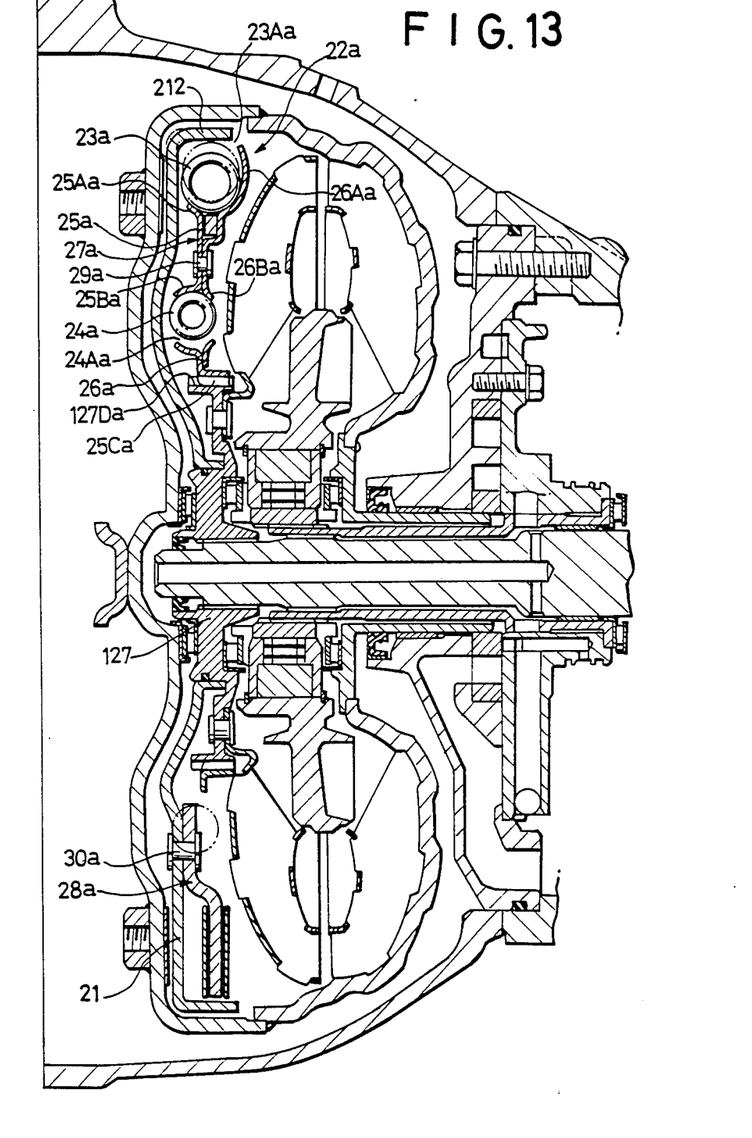
FIG. 13 is a cross sectional view of a second embodiment of the direct coupling clutch for hydraulic torque converters according to the present invention as it is in assembly in such a converter.

In the driven plate 27a, the outer toroidal channel 23Aa is formed along a diameter adjacent to the outermost periphery of the piston member 21, the outer sleeve 212 stands to close enough to form a roof for the outer channel 23Aa, as may best shown in FIG. 13.

Also, the first guide plate 25a is provided with a circumferential splined or castellated surface 25Ca adjacent to its internal periphery for engagement with a cooperative castellated surface 127Da formed in the outside circumference of the converter output shaft hub 127.

The first guide plate 25a is secured to the second guide plate 26a with revets 29a located at points midway between the inner and outer springs 23a and 24a, with caulking to tighten the assembly, in such a manner as to keep the coil springs retained in positions inside the inner and outer channels 23Aa and 24Aa.

The drive plate 28a is formed with circumferential windows 282a adjacent to its external periphery, properly spaced apart along the diameter and sized such as to receive therein the coil springs 23a in the outer channel 23Aa. With this arrangement, change in torque developed between the drive and driven plates 28a and 27a at the lockup of the converter is, if below a certain magnitude, damped by the coil springs 23a as they are compressed by the windows 282a where the angle of relative rotation of the drive plate 28a to the driven plate 27a is smaller then a predetermined value.

Also, the drive plate 28a is provided with a number of radially invardly extending engaging projections 283a, preferably circumferentially equally spaced apart adjacent to its internal periphery, and the drive plate 28a is secured to the piston member 21 with rivets 30a, making the drive plate 28a integral with the piston member. The engaging projections 283a are provided such that, when the difference in torque between the drive and driven plates 27a and 28a exceeds the foregoing certain magnitude, the projections bring their lower end into engagement with the respective spring 24a in the inner channel 24Aa, where the angle of relative rotation of the drive plate 28a to the driven plate 27a is somewhere in a range above the foregoing predetermined value.

Although the present invention has been descdribed in its application for torque converters, it can also be employed in any device which transmits rotation between shafts through the acceleration and deceleration of a fluid such as oil.

In addition, although the damper employs coil springs as the resilient member for damping, this is only a matter of choice and any other suitable resilient material may be used such as a leaf spring, tension coil spring, rubber, dual coil spring, or a compression spring combined with rubber.

Furthermore, in a modification of the present invention, the coil springs in the outer channel may be urged by engaging projections formed in the drive plate, instead of the windows.

Additionally, in another modification, the drive plate may be composed of a pair of properly divided guide plates, and the guide plates of the driven plate may be built into a unitary member, instead.

Still additionally, the coil springs in the outer and inner toroidal channels may by arranged circumferentially along a single diameter, in order to simplify the design, with necessary attendant modifications.

What is claimed is:

1. A direct coupling clutch having an unitary assembled damper device for a fluid coupling comprising:

fluid coupling including at least an input shaft, an output shaft, a fluid casing concentrically secured with said input shaft, a pump impeller mounted on said fluid casing and a turbine runner connected to said input sahft through a turbine hub, direct coupling clutch including a piston member axially slidably mounted on one of said output shaft and turbine hub and adapted to engage with and disengage from a portion of said fluid casing and a fluid line including at least a fluid passage being capable for selectIvely connecting a passage existing between said portion of said fluid casing and said piston member to a pressurized fluid source and a drain port; and a unitary assembled damper device disposed between said turbine hub and piston member and being capable of connecting said hub and piston member, said unitary assembled damper device including a driven plate consisting of two annular guide plates positioned concentrically with each other and forming a double rows of toroidal spaces arranged along two concentric circles in equally spaced apart layout in circumferential directions therebetween, a plurality of resilient members inserted in each of said toroidal spaces and located between radially extending side edges thereof, an annular drive plate having a number of radially extending edges formed therein and interposed concentrically with and between said guide plates and being slidable with respect to said guide plates in circumferential direction adapted to compress all of said resilient members between said side edges of the spaces formed in said guide plates and edges formed in said drive plate by relative rotation with respect to said driven plate and fastening means located between said two concentric circles to secure said guide plates with each other for unitary assembling said damper device.

2. The direct coupling clutch according to claim 1, wherein said driving plate comprises a row of windows having said radially extending edges therein and being located along a circle having a diameter similar to that of the outer one of said two concentric oircles for receiving therein, respectively, one of said resilient members inserted in the outer row of said toroidal spaces and a row of projections projecting radially inwardly from an inner periphery of said drive plate and being located along a circle having a diameter similar to that of the inner one of said two concentric ciicles for forming said radially extending edges.

* * * * *